July 7, 1970  H. E. CAUPEIL  3,519,392
GAS-ANALYSING APPLIANCE
Filed Feb. 9, 1967

INVENTOR.
Henri E. Caupeil

July 7, 1970          H. E. CAUPEIL          3,519,392
GAS-ANALYSING APPLIANCE
Filed Feb. 9, 1967          2 Sheets-Sheet 2
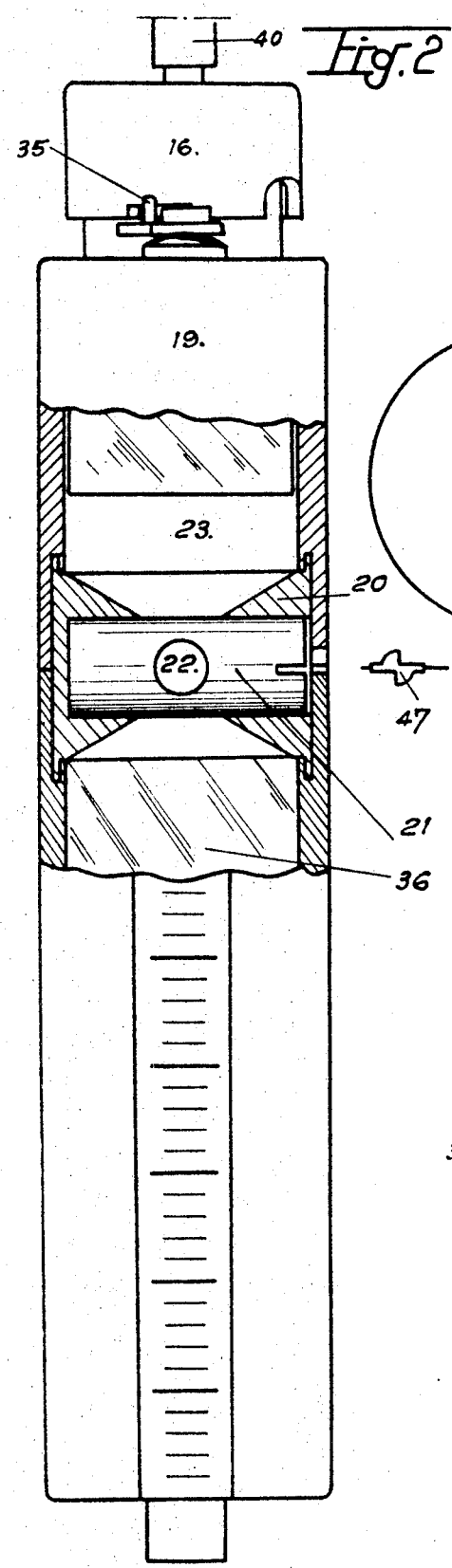
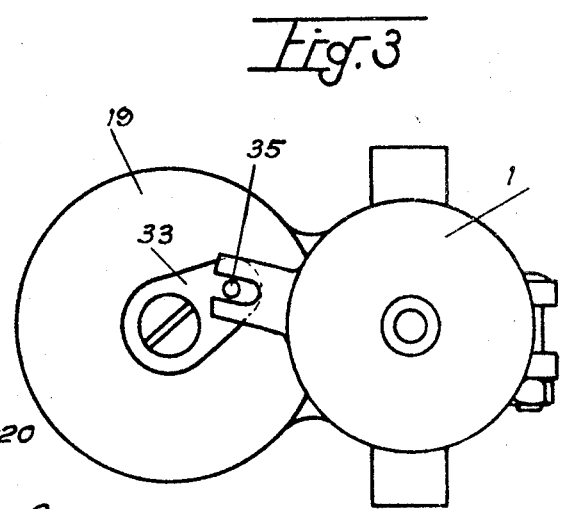
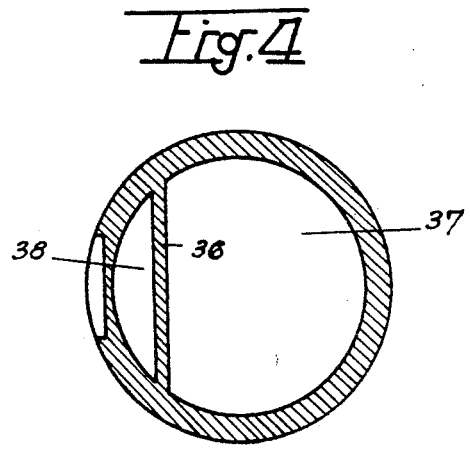

3,519,392
GAS-ANALYSING APPLIANCE
Henri E. Caupeil, Courbevoie, France, assignor to Societe d'Instrumentation Schlumberger, Paris, France, a corporation of France
Filed Feb. 9, 1967, Ser. No. 614,927
Claims priority, application France, Feb. 14, 1966, 49,526
Int. Cl. G01n 1/24, 31/06
U.S. Cl. 23—254        7 Claims

ABSTRACT OF THE DISCLOSURE

A gas-analysing appliance in which a component of the gas is absorbed by a reagent, and the consequent pressure-reduction of the gas is measured to determine the quantity of the component absorbed, the appliance having a volumetric type pump enabling a measured quantity of gas to be passed through the appliance, a filter provided in the pump inlet to remove solid particles from the gas entering the appliance and provide a measure of the opacity of the gas, and a temperature senser provided in the pump inlet to measure the temperature of the gas.

---

This invention relates to gas-analysing appliances.

More and more importance is being attached to the observation of atmospheric pollution, which entails taking samples of gas—particularly fumes—at suitable points and determining from them the coefficient of opacity, the content of carbon dioxide or oxygen and the temperature. This provides a measure of the amount of solids in suspension in the atmosphere and of the quantity of noxious or characteristic gases in the air.

The determination of these characteristics, though apparently simple to carry out, nevertheless presents certain difficulties when it is desired to make comparisons between the results obtained. These difficulties arise, more particularly, from the fact that fumes and similar gases are generally not very homogeneous or stable.

One known analyser is that described in U.S. Pat. No. 2,363,027. This consists essentially of a pump and of a chamber suitable for receiving a given volume of the gas that is to be analysed, which latter has already been freed from smoke, the chamber containing a reagent capable of absorbing the gas to be tested, a measuring instrument being provided for gauging the volume of gas so absorbed.

Such an appliance indicates only the proportion of carbon dioxide or oxygen (according to the reagent used) present in the fumes. It gives no indication of the opacity or temperature of the fumes. It is essential, however, if one is to be able to appreciate at any given moment the waste in boiler flue fumes, to know at that moment the percentage of $CO_2$ produced, the degree of blackening and the temperature of the fumes. The ability to take these three measurements simultaneously is necessary for a complete study of the combustion of a boiler.

The present invention therefore has, as its object, an apparatus with which one can measure, from the same sample of gas, on the one hand the opacity and on the other hand the content of carbon dioxide or oxygen and, if desired, the temperature of that sample.

According to the invention, a gas analyser of the type which incorporates a reagent for absorbing the gas that is to be tested is characterized in that the pump which it comprises is of the volumetric type, and is provided with a valve-controlled intake duct, at the entrance to which there is an interchangeable filter, this pump communicating through a delivery valve with a sampling chamber that on the one hand can be opened to the atmosphere while the pump is operating and on the other hand can be cut off from the atmosphere during the measurement time proper and connected to the absorption chamber containing the reagent.

By means of this arrangement, the volume of the gas sample cleaned by the filter is known, and this sample is the one which is subsequently analysed by measurement of the gas absorbed by the reagent.

According to another feature of the invention, the pump intake duct incorporates a temperature sensor associated with a temperature indicator.

Thus one has available the three parameters (opacity, proportion of a characteristic gas and temperature) necessary for studying boiler combustion, by which the combustion gases are characterised at a particular moment.

According to a further feature of the invention, the absorption chamber is divided lengthwise by a partition into two unequal intercommunicating compartments. The larger of these, which constitutes the absorption chamber proper, can accommodate the whole of the gas rising from the sampling chamber when the apparatus is inverted, while the smaller compartment, which constitutes a graduated measuring column with a transparent wall, is provided, at the end remote from the sampling chamber, with a cut-off, by means of which atmospheric pressure can be re-established in the said chambers after the gas has been bubbled through the reagent.

By this arrangement, atmospheric pressure is applied directly to the measuring column and the level of the reagent in that column is lowered to an extent exactly proportional to the asorption by the reagent of the gas under test. This represents an advantage over the apparatus described in the patent already mentioned, which in fact has a flexible pressure-equalising diaphragm, and thereby necessarily introduces error into the measurement.

Further features of the invention will become apparent from the following description, given by way of example only, in conjunction with the accompanying drawings, in which:

FIG. 2 is a view, partially cut away, drawn at right angles to FIG. 1;

FIG. 3 is a plan; and

FIG. 4 is a section along IV—IV in FIG. 1.

Figure 1:
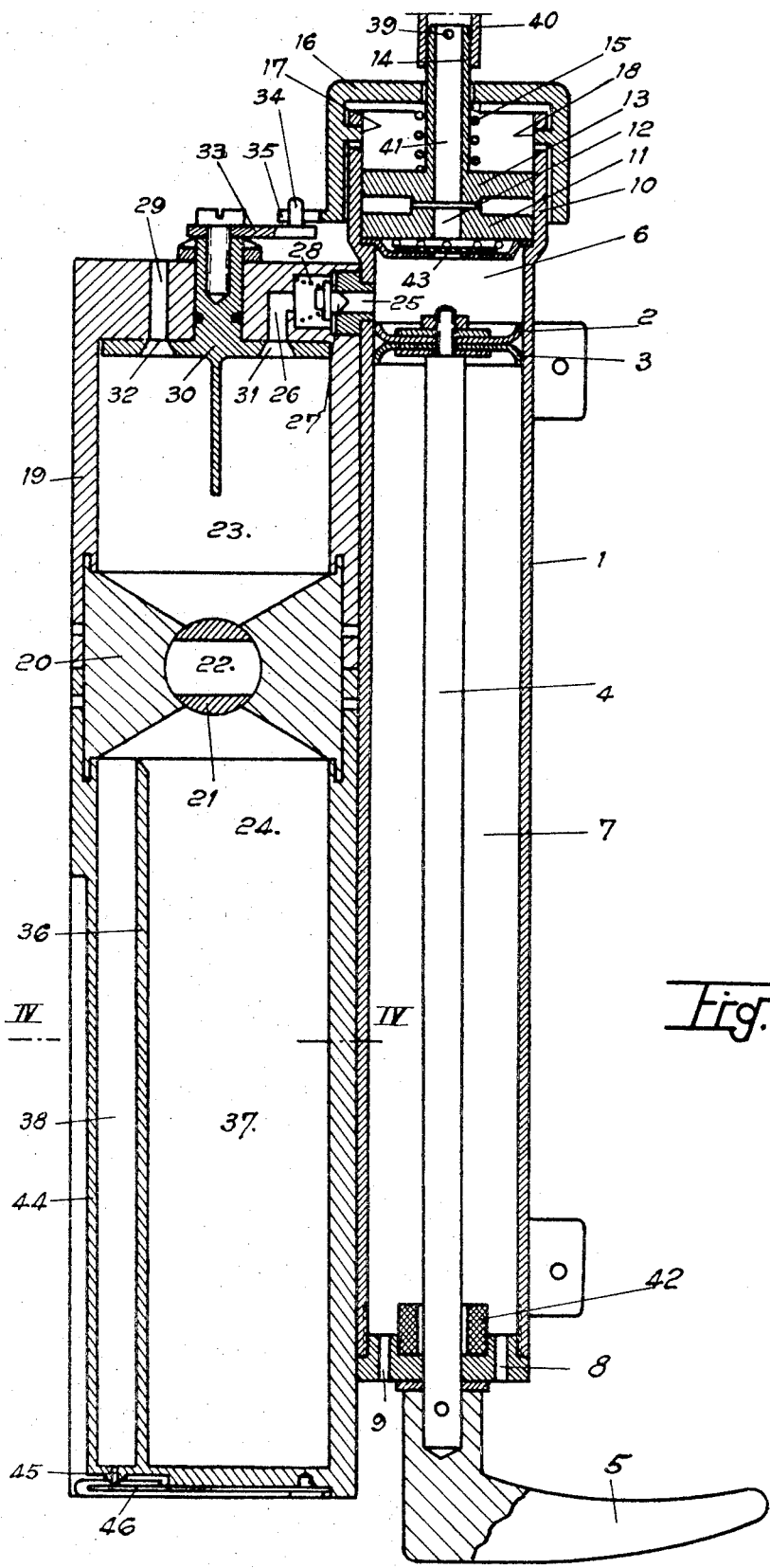
FIG. 1 is a sectional side view of an appliance embodying the principle of the invention.

In the example illustrated in FIG. 1, the measuring equipment here proposed consists of two main components, which may be made in one piece or be separately machines and subsequently assembled. The first of these components consists of a pump body 1, within which slides a piston composed of two dished plates 2 and 3, placed back to back and mounted on the end of the piston rod 4, the opposite end of which protrudes and is rigidly attached to the handle 5, by which it can be operated. The plates 2 and 3 thus divide this pump body into two chambers 6 and 7, the latter of which can communicate with the atmosphere through passages such as 8 and 9. The opposite end of the pump body opens out slightly, as shown at 10, forming a shoulder against which a fixed holder plate 11, centrally drilled at 12, can bear. Bearing on this holder plate is a second holder plate 13, guided by a stem 14, which contains an axial passage and is thrust against the holder plate 11 by a spring 15, interposed between it and the cap 16, which can be locked in place over the end of the pump body by a bayonet-type fitting, as shown at 17–18.

The second main component of this equipment consists of a gas-analysis cylinder 19, divided into two principal chambers by a partition 20, provided with a central aperture closed by the plug 21 of a cock or valve than can be operated from outside, this plug containing a passage 22 whereby the two chambers 23 and 24 can be interconnected at will. As will be apparent subsequently the plug 21 serves to selectively open a sampling chamber to a reaction chamber to cause the desired reaction between a reagent and the gas constituent of interest.

The pump chamber 6 communicates by way of passages 25 and 26 with the chamber 23, the cubic capacity of which is determined beforehand, this chamber being known as the "sampling chamber." Passages 25 and 26 are separated by a valve 27 which is held by the spring 28 against the entrance of the passage 26. Thus, the valve 27 is essentially a pressure-responsive valve which allows unidirectional gas flow from the pump chamber 6 into the inlet 26. The rear end of the chamber 23 can communicate with the atmosphere through the passage 29.

The passages 26 and 29 can be closed by means of a circular plate 30, containing two apartures 31 and 32, which can be brought into line with the passages 26 and 29. This plate can be rotated, by virtue of the fact that it is rigidly connected to a small arm 33, fitted with a pin 34, which fits between the two prongs of a fork 35, fixed to the cap 16.

The arrangement is such that, when the cap 16 is in the closed position shown in FIG. 1, the passages 26 and 29 and the apertures 31 and 32 respectively are in line. Thus, the plate 30 is rotatable in one direction through rotation of the cap 16 to simultaneously open the inlet passage 26 and the outlet passage 29 to permit gas flow through the sampling chamber 23 and is rotatable in a reverse direction through reverse rotation of the cap 16 to simultaneously close the inlet passage 26 and the outlet passage 29 to enclose gas within the chamber 23.

Finally, the chamber 24, which may be called a reaction chamber, is divided by a partition 36, into an absorption chamber proper 37, and a measurement, or reagent-containing chamber 38, which is smaller. It is this chamber 24 which receives the absorbent reagent to be used for measurement. In the case of carbon dioxide, a solution of sodium or potassium should be used. In the case of oxygen, which is the second gas with which one is concerned in combustion investigations, use may be made of chromous chloride ($Cl_3Cr$) in a hydrochloric solution ($ClH+H_2O$).

The equipment should preferably be completed with a temperature sensor 39, placed where the gases enter the apparatus.

The equipment described above is used in the following way:

With the aid of a length of flexible tubing 40, the pump body, and more specifically the axial passage 41 in the stem 14, is placed in communication with the space from which the sample is to be taken. A filter paper is inserted between the holder plates 11 and 13, so that it will be traversed by the air drawn in by the pump, the bayonet fitting then being used to secure the cap in position. The equipment as a whole will then be as shown in FIG. 1. The pump is then operated by means of the handle 5, the piston stroke being limited by the stop 42. The maximum and minimum capacities of the chamber 6 being known, one thus has at one's disposal a volumetric pump with which to determine precisely how much gas is thus introduced into the equipment at each piston stroke. This gas, the temperature of which is measured at 39, gives up the particles of solid matter suspended in it, these being left behind on the filter paper placed between holders 11 and 13. On the delivery stroke, the pressure exerted by the piston in the chamber 6 forces a small freely mounted plate 43, against the outlet from passage 12, so that the gas drawn into the chamber 6 is driven into the chamber 23, against the action of the valve 27, by way of the passages 25 and 26. The gas in question returns to the atmosphere through the aperture 32 and the passage 29.

When a suitable volume of gas has passed through the filter paper, with the equipment in the position shown in FIG. 1, the cap 16 is turned, the first result of this being to rotate the plate 30 and consequently to isolate the sampling chamber 23. When the temperature reading has been taken, the cap 16 may be removed, releasing the filter paper, the shade of which is compared with a standard shade card. This provides a measure of the opacity.

The flexible tubing 40 having been disconnected, the apparatus is inverted and communication is established between the chambers 23 and 37 by rotation of the plug 21. To turn this plug, one may use a flat key (47 in FIG. 2), the advantage of which is that it cannot be withdrawn while the chambers 23 and 24 are interconnected through the plug 21. As a result of this action, the gas contained in the sampling chamber 23 rises into the absorption chamber 37, the measurement chamber 38 remaining full of reagent because of its being off centre. By being bubbled through the reagent in the chamber 37, the gas under test undergoes a certain reduction in pressure, through part of the constituents of this gas being absorbed. Upon the completion of absorption, measurement is carried out with the aid of a graduated scale marked on the transparent side 44, of the measurement chamber 38, this chamber 38 being opened directly to the atmosphere through the passage 45 and the valve 46. The graduated scale, the transparent side 44 and the chamber 38 form a pressure measuring system for the appliance. The apparatus having been inverted, the passage 45 comes at the top. Because of the drop in pressure within the chamber 37, the column of liquid contained in the chamber 38 is lowered until equilibrium has been established between the two chambers; the reading may then be taken. The scale 44 may be graduated to give a direct reading of the percentage of gas absorbed in relation to the total volume of gas introduced into the apparatus.

It is possible, of course, to derive information of many kinds by means of this device, according to the nature of the reagent placed in the chamber 37.

The embodiment of the invention principle described here is merely one example thereof, the details of which may be modified in many respects without going beyond the scope of the invention.

I claim:

1. A gas-analysing appliance of the type in which a liquid reagent is caused to absorb a component of the gas resulting in a pressure-reduction in the gas, and the quantity of gas absorbed is measured by measuring said pressure reduction, said appliance comprising, a pump body having an inlet for said gas, a pump of known volumetric capacity in communication with the inlet and movable within said pump body for intaking gas from said inlet and for discharging said gas, and a gas-analysis chamber communicating with said pump to receive gas discharged therefrom, and containing said liquid reagent for absorbing said gas component, and pressure-measuring means in said gas-analysis chamber for measuring said pressure-reduction, and wherein filter means is mounted in said inlet to remove solid particles from gas passing through said inlet to said pump, said filter means comprising, two plates traversed by a passage formed in said inlet, a filter disposed between the plates, and a spring biasing the plates toward each other.

2. An appliance according to claim 1 which further comprises, a temperature sensor mounted within said pump inlet.

3. A gas-analysing apparatus of the type in which a liquid reagent is caused to absorb a constituent of the gas resulting in a pressure-reduction in the gas, and the quantity of gas absorbed is measured by measuring said pressure-reduction, said apparatus comprising, a pump body having an input for said gas, a pump of known volumetric capacity within said pump body for intaking gas from said input and for discharging said gas, filter means mounted in said input to remove solid particles from gas passing through said input to said pump, a gas sampling chamber having an inlet communicating with said pump and an outlet, pressure-responsive means mounted in said inlet and operative to allow unidirectional gas flow from said pump into said sampling chamber, the sampling chamber outlet communicating with atmosphere, means movable to simultaneously open said inlet and outlet to permit the flow of gas through the sampling chamber to atmosphere and to simultaneously close said inlet and outlet to enclose gas within the sampling chamber, a reaction chamber containing a reagent for absorbing said constituent, means for selectively opening the sampling chamber to said reaction chamber to permit a reaction between said reagent and the gas in said sampling chamber, and means coupled to said reaction chamber for measuring the pressure-reduction in said reaction chamber resulting from the reaction between said reagent and said gas constituent.

4. A gas-analysing apparatus of the type in which a liquid reagent is caused to absorb a constituent of the gas resulting in a pressure-reduction in the gas, and the quantity of gas absorbed is measured by measuring said pressure-reduction, said apparatus comprising, a pump body having an input for said gas, pump means of known volumetric capacity within said pump body for intaking gas from said input and for discharging said gas, filter means mounted in said input to remove solid particles from gas passing through said input to said pump means, a gas sampling chamber having an inlet communicating with said pump means and an outlet, pressure-responsive means mounted in said inlet and operative to allow unidirectional gas flow from said pump means into said sampling chamber, the sampling chamber outlet communicating with atmosphere, means movable to simultaneously open said inlet and outlet to permit the flow of gas through the sampling chamber to atmosphere and to simultaneously close said inlet and outlet to enclose gas within the sampling chamber, an elongated chamber having an inlet which communicates with said sampling chamber, a longitudinal partition dividing said elongated chamber into an absorption chamber containing said liquid reagent and a pressure-measuring chamber, the latter chamber communicating with said absorption chamber adjacent said elongated chamber inlet valve means located between said sampling chamber and said elongated chamber inlet for selectively opening said elongated chamber inlet to said sampling chamber, said absorption chamber being dimensioned to accommodate the whole of the gas sample flowing from the sampling chamber when the apparatus is inverted and said valve means is opened, said pressure measuring chamber having a transparent wall portion mounting a graduated scale, and means movable to open and close said pressure measuring chamber to atmosphere.

5. A gas-analysing apparatus of the type in which a liquid reagent is caused to absorb a constituent of the gas resulting in a pressure-reduction in the gas, and the quantity of gas absorbed is measured by measuring said pressure-reduction, said apparatus comprising, a casing having an input for said gas, a pump of known volumetric capacity within said casing, a gas sampling chamber having an inlet communicating with said pump and an outlet, means mounted in said inlet and operative to allow unidirectional gas flow from said pump into said sampling chamber, the sampling chamber outlet communicating with atmosphere, means movable to simultaneously open said inlet and outlet to permit the flow of gas through the sampling chamber to atmosphere and to simultaneously close said inlet and outlet to confine gas within the sampling chamber, a reaction chamber containing a reagent for absorbing said constituent, means for selectively opening the sampling chamber to said reaction chamber to permit a reaction between said reagent and the gas in said sampling chamber, and means coupled to said reaction chamber for measuring the pressure-reduction in said reaction chamber resulting from the reaction between said reagent and said gas constituent.

6. A gas-analysing apparatus of the type in which a liquid reagent is caused to absorb a constituent of the gas resulting in a pressure-reduction in the gas, and the quantity of gas absorbed is measured by measuring said pressure-reduction, said apparatus comprising, a pump body having an input for said gas, pump means of known volumetric capacity within said pump body for intaking gas from said input and for discharging said gas, filter means mounted in said input to remove solid particles from gas passing through said input to said pump means, said filter means being of a type which allows the opacity to be determined, temperature sensing means mounted in the casing input for measuring the temperature of the gas therein, a gas sampling chamber having an inlet communicating with said pump means and an outlet, the sampling chamber outlet communicating with atmosphere, means movable to simultaneously open said inlet and outlet to permit the flow of gas through the sampling chamber to atmosphere and to simultaneously close said inlet and outlet to seal gas within the sampling chamber, an elongated chamber having an inlet which communicates with said sampling chamber, a longitudinal partition dividing said elongated chamber into an absorption chamber containing said liquid reagent and a pressure-measuring chamber, the latter chamber communicating with said absorption chamber adjacent said elongated chamber inlet, valve means located between said sampling chamber and said elongated chamber inlet for selectively opening said elongated chamber inlet to said sampling chamber, said absorption chamber being dimensioned to accommodate the whole of the gas sample flowing from the sampling chamber when the apparatus is inverted and said valve means is opened, the measuring chamber having a transparent wall portion mounting a graduated scale, and means movable to open and close the measuring chamber to atmosphere.

7. The apparatus as claimed in claim 6 wherein said measuring chamber encloses a liquid, the height of which liquid relative to said graduated scale providing a visual indication of the pressure in said absorption chamber.

References Cited

UNITED STATES PATENTS

| 1,023,188 | 4/1912 | Wilson | 23—255 |
| 3,166,938 | 1/1965 | Weyrauch et al. | 23—232 XR |

OTHER REFERENCES

Rounds et al., Anal. Chem. 27, 829–830 (1955).

JOSEPH SCOVRONEK, Primary Examiner

R. M. REESE, Assistant Examiner

U.S. Cl. X.R.

23—232; 73—421.5